(12) United States Patent
Yokoyama

(10) Patent No.: US 8,743,474 B2
(45) Date of Patent: Jun. 3, 2014

(54) LENS APPARATUS AND TV CAMERA

(75) Inventor: Satoki Yokoyama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/221,599

(22) Filed: Aug. 30, 2011

(65) Prior Publication Data

US 2012/0050887 A1 Mar. 1, 2012

(30) Foreign Application Priority Data

Aug. 30, 2010 (JP) ................................. 2010-192991

(51) Int. Cl.
*G02B 15/14* (2006.01)
*G02B 7/02* (2006.01)

(52) U.S. Cl.
USPC ............................. 359/699; 359/813; 359/822

(58) Field of Classification Search
USPC ......... 359/694, 696, 699–701, 703–704, 811, 359/813, 815, 819, 822–823, 826–827, 359/829–830; 396/79, 83; 353/101; 350/429, 521, 522, 530, 556
See application file for complete search history.

(56) References Cited

U.S. PATENT DOCUMENTS 6,130,715 A 10/2000 Matsui et al.

FOREIGN PATENT DOCUMENTS

| JP | H09-033785 A | | 2/1997 |
| JP | 09-080289 | | 3/1997 |
| JP | 2001166194 A | * | 6/2001 |
| JP | 2003-207709 A | | 7/2003 |
| JP | 2008-197354 | | 8/2008 |

OTHER PUBLICATIONS

European Search Report—EP 11 17 9259—Dec. 1, 2011.
Japanese Office Action issued on Jan. 28, 2014 in corresponding Japanese Patent Application No. 2010-192991.

* cited by examiner

*Primary Examiner* — Dawayne A Pinkney
(74) *Attorney, Agent, or Firm* — Young & Thompson

(57) ABSTRACT

A lens apparatus includes an optical system, a lens barrel, and a weight. The optical system includes a movable lens unit. The lens barrel houses the optical system and includes a fixed barrel and a cam barrel. The fixed barrel supports the movable lens unit to be forwardly and backwardly movable along the optical axis of the optical system. The cam barrel is engaged with the movable lens unit, is supported by the fixed barrel to be rotatable around the optical axis, and is configured to forwardly and backwardly move the movable lens unit in accordance with the rotation of the cam barrel. The weight is engaged with the cam barrel and forwardly and backwardly moves along the optical axis in a direction opposite to a moving direction of the movable lens unit in accordance with the rotation of the cam barrel.

18 Claims, 3 Drawing Sheets

LENS APPARATUS AND TV CAMERA

CROSS-REFERENCE TO RELATED APPLICATIONS

This application claims the benefit of Japanese Patent Application No. 2010-192991 (filed on Aug. 30, 2010), the entire contents of which are hereby incorporated by reference.

BACKGROUND

1. Technical Field

The present invention relates to a lens apparatus including a movable lens unit forwardly and backwardly moving along an optical axis in a lens barrel, and a TV camera including the lens apparatus.

2. Related Art

A lens apparatus mounted in a TV camera such as an ENG (Electronic News Gathering) camera or a cine camera includes a movable lens unit, such as a zoom lens group, forwardly and backwardly moving along an optical axis in a lens barrel. The lens barrel includes a fixed barrel for supporting the movable lens unit to be forwardly and backwardly movable around the optical axis, a cam barrel supported to the fixed barrel to be rotatable around the optical axis, and an operation ring for operating the rotation of the cam barrel. The movable lens unit is engaged in the cam barrel and forwardly and backwardly moves by rotation of the cam barrel. A lens apparatus, in which the operation ring is driven by a servo motor, has been known (for example, refer to JP-A-9-80289).

When the lens barrel is slanted, torque is generated to the cam barrel due to the self-weight of the movable lens unit. If the operation ring is driven by a motor as in the lens apparatus described in JP-A-9-80289, even if the motor is loaded, and torque is generated to the cam barrel due to the self-weight of the movable lens unit, rotation of the cam barrel is prevented. However, if the lens apparatus does not include a motor, the cam barrel may be rotated so that the movable lens unit forwardly and backwardly moves.

If the friction between the fixed barrel and the cam barrel increases, even if torque is generated to the cam barrel due to the self-weight of the movable lens unit, the rotation of the cam barrel can be prevented, so that the movable lens unit can be prevented from forwardly and backwardly moving. However, a strong force is required to rotate the cam barrel, thereby deteriorating the operability to forwardly and backwardly move the movable lens unit.

SUMMARY OF INVENTION

The present invention has been made in consideration of the circumstances, and its object is to provide a lens apparatus capable of preventing movement of a movable lens unit due to the self-weight of the movable lens unit when a lens barrel is slanted.

According to an aspect of the invention, a lens apparatus includes an optical system, a lens barrel, and a weight. The optical system includes a movable lens unit. The lens barrel houses the optical system and includes a fixed barrel and a cam barrel. The fixed barrel supports the movable lens unit to be forwardly and backwardly movable along the optical axis of the optical system. The cam barrel is engaged with the movable lens unit, is supported by the fixed barrel to be rotatable around the optical axis, and is configured to forwardly and backwardly move the movable lens unit in accordance with the rotation of the cam barrel. The weight is engaged with the cam barrel and forwardly and backwardly moves along the optical axis in a direction opposite to a moving direction of the movable lens unit in accordance with the rotation of the cam barrel. The weight prevents the movement of the movable lens unit when the lens barrel is slanted so that the optical axis is slanted to the horizontal direction.

According to the present invention, the movable lens unit forwardly and backwardly moves along the optical axis due to rotation of the cam barrel. A weight also forwardly and backwardly moves along the optical axis in a direction opposite to the movable lens unit. When the lens barrel is slanted, the movable lens unit and the weight appear to forwardly and backwardly move along the optical axis in an identical direction, i.e., a forward direction or a backward direction, due to the self-weight of the movable lens unit and the weight. However, the rotation direction of the cam barrel with respect to the movement of the movable lens unit and the rotation direction of the cam barrel with respect to the movement of the weight are opposite to each other, so that the rotation of the cam barrel is prevented. Accordingly, when the lens barrel is slanted, the movement of the movable lens unit due to the self-weight of the movable lens unit can be prevented.

DETAILED DESCRIPTION

Figure 1:
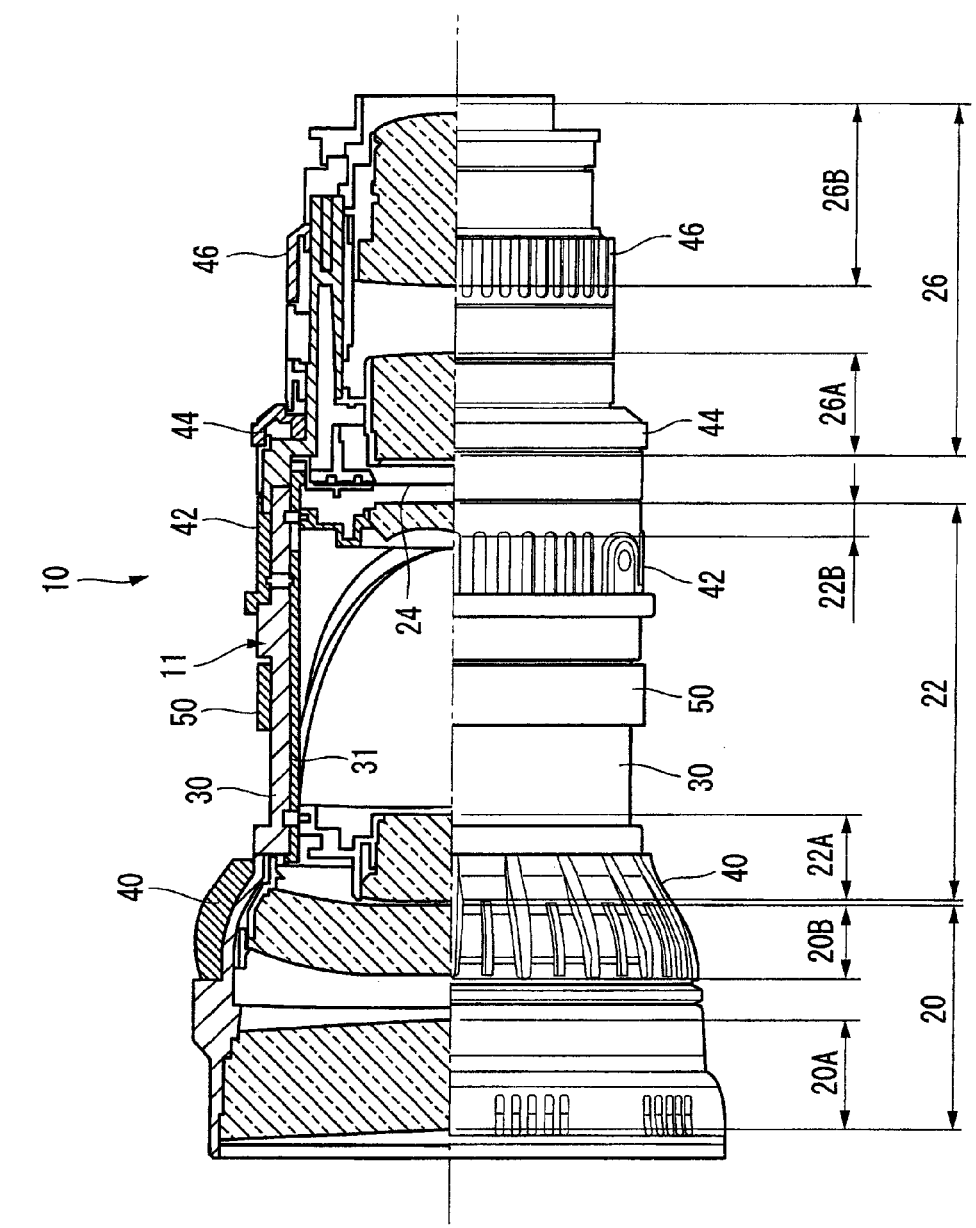
FIG. 1 shows an example of a lens apparatus to explain an embodiment of the present invention.

FIG. 1 shows an example of a lens apparatus.

A lens apparatus 10 illustrated in FIG. 1 includes a lens barrel 11 containing optical systems. The optical systems contained in the lens barrel 11 are largely classified into a focus optical system 20, a zoom optical system 22, an iris 24, and a master optical system 26 in order from the front side.

The focus optical system 20 is an optical system for adjusting an object distance to adjust a focus, i.e., a focus position (focus adjustment), and includes a fixed focus lens group 20A fixed at a certain position and a moving focus lens group 20B supported to be forwardly and backwardly movable along the optical axis. The moving focus lens group 20B moves so that the focus position varies.

The zoom optical system 22 is an optical system for adjusting a zoom ratio, i.e., a focus distance, and includes a ratio conversion system lens group 22A and a correction system lens group 22B, which are supported to be forwardly and backwardly movable along the optical axis. The ratio conversion system lens group 22A moves so that the focus distance varies. The correction system lens group 22B moves so that the variation of the focus position due to the movement of the ratio conversion system lens group 22A is suppressed. The ratio conversion system lens group 22A and the correction system lens group 22B cooperatively move in accordance with a position relation predetermined by a zoom driving mechanism, which will be described hereafter.

The iris 24 operates iris blades to be open and closed for adjustment of a light quantity thereby varying an aperture diameter.

The master optical system 26 is an optical system for finally forming an image and includes a front master lens group 26A and a rear master lens group 26B. The front master lens group 26A is fixed at a certain position. The rear master lens group 26B is movably supported along the optical axis for adjustment of a back focus or other purposes.

The lens barrel 11 has a focus driving mechanism, a zoom driving mechanism, an iris driving mechanism, and a master driving mechanism for driving the movably supported moving focus lens group 20B, the ratio conversion system lens group 22A, the correction system lens group 22B, the iris 24, and the rear master lens group 26B.

A focus ring 40, a zoom ring 42, an iris ring 44, and a back focus adjusting ring 46 are rotatably disposed on the outer circumferential part of the fixed barrel 11.

The focus driving mechanism is configured to enable the moving focus lens group 20B to forwardly and backwardly move along the optical axis by rotational operation of the focus ring 40.

The zoom driving mechanism is configured to enable the ratio conversion system lens group 22A and the correction system lens group 22B to forwardly and backwardly move along the optical axis by rotational operation of the zoom ring 42.

The iris driving mechanism is configured to enable the iris 24 to be open and closed by rotational operation of the iris ring 44.

The master driving mechanism is configured to enable the rear master lens group 26B to forwardly and backwardly move along the optical axis by rotational operation of the back focus adjusting ring 46.

In this specification, the movable lens unit means a lens moving by one driving mechanism, or an integrally or cooperatively moving lens group. In the lens apparatus 10, the moving focus lens group 20B, the ratio conversion system lens group 22A, the correction system lens group 22B, and the rear master lens group 26B correspond to the movable lens unit.

Hereinafter, a mechanism for preventing movement of the movable lens unit due to the self-weight of the movable lens unit will be described. In the description, the ratio conversion system lens group 22A and the correction system lens group 22B will be described as an example of the movable lens unit.

Figure 2:
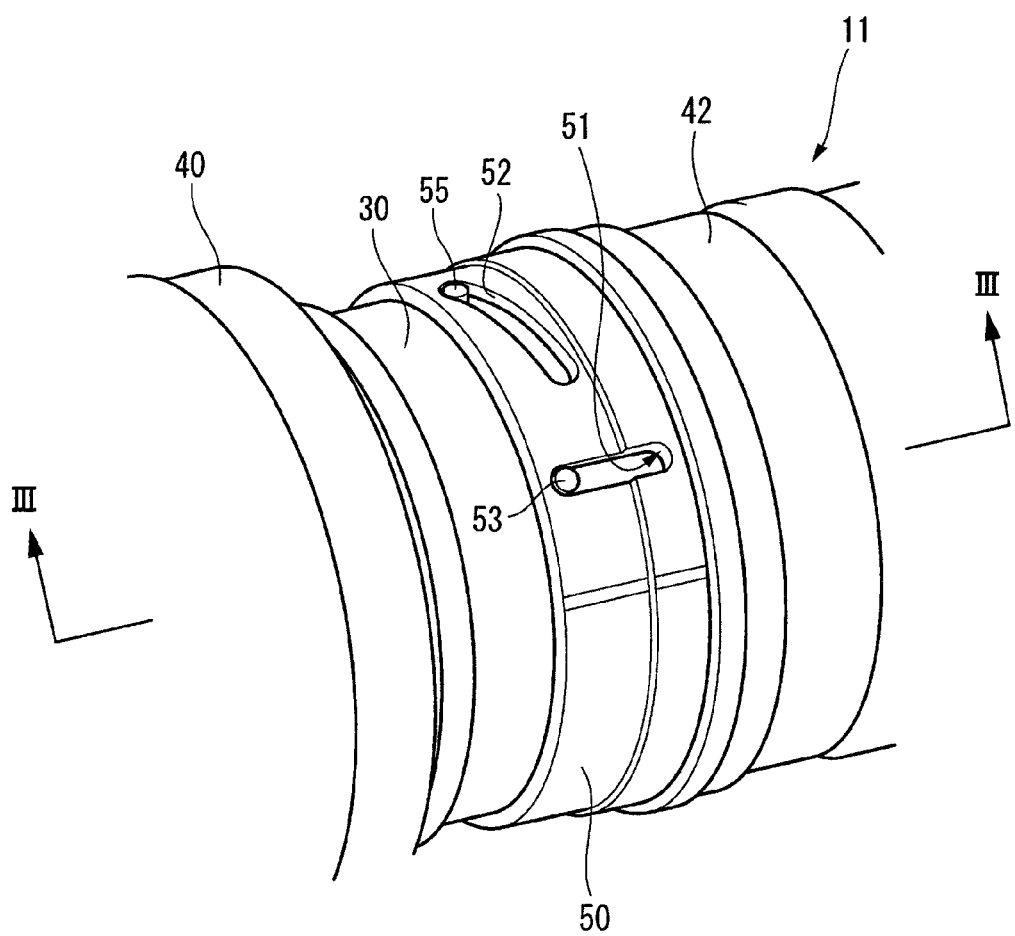
FIG. 2 shows a zoom driving mechanism of the lens apparatus of FIG. 1.
Figure 3:
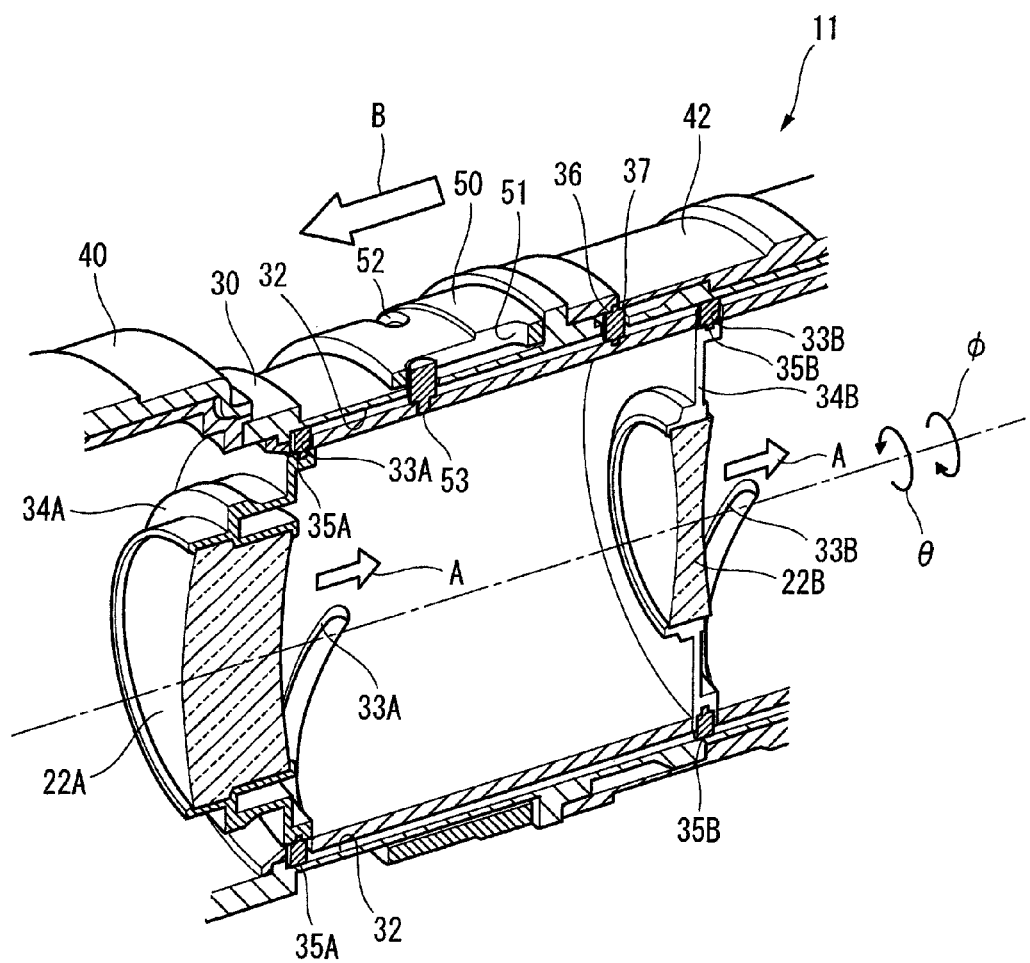
FIG. 3 shows a cross-section of the III-III line in FIG. 2.

FIGS. 2 and 3 show a zoom driving mechanism of the lens apparatus 10.

The lens barrel 11 includes a fixed barrel 30, and a cam barrel 31 fitted in the fixed barrel 30. The cam barrel 31 is rotatable around the optical axis. The zoom ring 42 is fitted outside the fixed barrel 30 to be rotatable around the optical axis.

On the inner circumferential surface of the fixed barrel 30, a linear guide groove 32 extending along the optical axis is provided. On the cam barrel 31, a cam groove 33A for moving the ratio conversion system lens group 22A and a cam groove 33B for moving the correction system lens group 22B are provided. The cam groove 33A penetrates from the inside of the cam barrel 31 to the outside thereof.

The cam grooves 33A and 33B are all in a spiral form. The cam grooves 33A and 33B have different lead angles and they are in the same wrapping form based on the optical axis. Each of the cam grooves 33A and 33B partially overlaps with the guide groove 32. The overlapping portion forwardly and backwardly moves along the optical axis in accordance with the rotation of the cam barrel 31.

In the lens frame 34A holing the ratio conversion system lens group 22A, a cam follower 35A is provided. The cam follower 35A corresponding to the lens frame 34A engages with the cam groove 33A at the overlapping portion between the guide groove 32 and the cam groove 33A. Subsequently, the cam follower 35A penetrates the cam groove 33A and is engaged with the guide groove 32.

The lens frame 34A engaging the cam follower 35A into the guide groove 32 and the ratio conversion system lens group 22A held in the lens frame 34A are supported to the fixed barrel 30 to be forwardly and backwardly movable along the optical axis. The overlapping portion between the guide groove 32 and the cam groove 33A forwardly and backwardly moves along the optical axis due to the rotation of the cam barrel 31, so that the lens frame 34A engaging the cam follower 35A into the cam groove 33A and the ratio conversion system lens group 22A held in the lens frame 34A move along the optical axis, in cooperation with the rotation of the cam barrel 31.

Likewise, in the lens frame 34B holding the correction system lens group 22B, a cam follower 35B is provided. The lens frame 34B engages the cam follower 35B into the cam groove 33B at the overlapping portion between the guide groove 32 and the cam groove 33B. Subsequently, the cam follower 35B penetrates the cam groove 33B and is engaged into the guide grove 32. The lens frame 34B and the correction system lens group 22B held in the lens frame 34B are supported to the fixed barrel 30 to be backwardly and forwardly movable along the optical axis, and move along the optical axis in cooperation with the rotation of the cam barrel 31.

The rotation of the cam barrel 31 is realized by rotational operation of the zoom ring 42. The zoom ring 42 is connected to the cam barrel 31 through a connection pin 36 penetrating from the inside of the fixed barrel 30 to the outside thereof. The rotation of the zoom ring 42 is transferred to the cam barrel 31 through the connection pin 36. The cam barrel 31 is rotated around the optical axis in an integrated form with the zoom ring 42.

On the fixed barrel 30, a penetration hole 37, which the connection pin 36 penetrates, is provided. The penetration hole 37 is extended in the circumferential direction of the fixed barrel 30. The connection pin 36 is movable in the extended direction in the penetration hole 37. The range of the rotation of the zoom ring 42 and the cam barrel 31 around the optical axis is defined by the penetration hole 37.

In the zoom driving mechanism described above, a weight 50 is additionally provided. The weight 50 is in a circular shape and fitted outside the fixed barrel 30 to be moveable around the optical axis and forwardly and backwardly movable along the optical axis. The weight 50 is disposed at an empty space on the outer circumference of the fixed barrel 30 overlapping with the cam barrel 31 while escaping the zoom ring 42. The weight 50 moves along the optical axis, in cooperation with the rotation of the cam barrel 31.

In the weight 50, a linear guide groove 51 extending along the optical axis and a spiral cam groove 52 based on the optical axis are provided. In the example illustrated, the guide groove 51 and the cam groove 52 penetrate from the inside of the weight 50 to the outside thereof. However, the grooves are preferably exposed on at least the inner circumferential surface of the weight 50.

In the cam barrel 31, an engaging pin 53 is provided. The engaging pin 53 penetrates from the inside of the fixed barrel 30 to the outside thereof to be engaged into the guide groove 51 of the weight 50. In the fixed barrel 30, a penetration hole, which the engaging pin 53 penetrates, is extended in the circumferential direction of the fixed barrel 30. The rotation of the cam barrel 31 is transferred to the weight 50 through the engaging pin 53. The weight 50 is rotated around the optical axis in an integrated form with the cam barrel 31.

In the fixed barrel 30, a cam pin 55 is provided. The cam pin 55 is engaged into the cam groove 52 of the weight 50.

The weight 50 is rotated around the optical axis due to the rotation of the cam barrel 31, so that the immovable cam pin 55 moves in a direction opposite to the rotation direction of the weight 50. In this case, the weight 50 comes in sliding contact with the cam pin 55 on the inner side surface of the cam groove 52. Since the cam groove 52 is a spiral groove based on the optical axis, the weight 50 moves along the optical axis.

The cam grooves 33A and 33B of the cam barrel 31 for driving the ratio conversion system lens group 22A and the correction system lens group 22B, and the cam groove 52 of the weight 50 for driving the weight 50 are different in the spiral wrapping form. In the example illustrated, when viewed at the front side (object side), the cam grooves 33A and 33B are in the forwardly wrapping form in the counterclockwise direction, and the cam groove 52 is in the forwardly wrapping form in the clockwise direction.

The ratio conversion system lens group 22A, the correction system lens group 22B, and the weight 50 move along the optical axis in cooperation with the rotation of the cam barrel 31. However, since the cam grooves 33A and 33B and the cam groove 52 are different in the spiral wrapping form, the movement direction of the ratio conversion system lens group 22A and the correction system lens group 22B and the movement direction of the weight 50 are opposite to each other.

For example, if the cam barrel 31 is rotated around the optical axis in an arrow θ direction, the ratio conversion system lens group 22A and the correction system lens group 22B move along the optical axis in an arrow A direction (backwardly). The weight 50 moves along the optical axis in an arrow B direction (forwardly).

Conversely, the rotation direction of the cam barrel 31 when the ratio conversion system lens group 22A and the correction system lens group 22B move along the optical axis in a predetermined direction, and the rotation direction of the cam barrel 31 when the weight 50 moves along the optical axis in the same direction as that of the ratio conversion system lens group 22A and the correction system lens group 22B are opposite to each other.

If the lens barrel 11 is slanted so that the optical axis is slanted to the horizontal direction, the ratio conversion system lens group 22A, the correction system lens group 22B, and the weight 50 tend to move along the optical axis in an identical direction due to their self-weight.

For example, if the front side of the lens barrel 11 is lifted, the ratio conversion system lens group 22A, the correction system lens group 22B, and the weight 50 tend to move along the optical axis in the arrow A direction (backwardly) due to their self-weight.

In that case, although the ratio conversion system lens group 22A and the correction system lens group 22B move in the arrow A direction, the cam barrel 31 is rotated in the arrow θ direction. Meanwhile, when the weight 50 moves in the arrow A direction, the cam barrel 31 is rotated in an arrow Φ direction opposite to the arrow θ direction. Accordingly, the cam barrel 31 is prevented from being rotated in any of the arrow θ direction and the arrow Φ direction. Also, the movement of the ratio conversion system lens group 22A and the correction system lens group 22B due to their self-weight is prevented.

In other words, the self-weight of the ratio conversion system lens group 22A and the correction system lens group 22B is converted into torque around the optical axis by the spiral cam grooves 33A and 33B based on the optical axis and generated to the cam barrel 31. The self-weight of the weight 50 also is converted into torque around the optical axis by the spiral cam groove based on the optical axis and generated to the cam barrel 31. The generated torque is balanced so that the rotation of the cam barrel 31 is prevented. Also, the movement of the ratio conversion system lens group 22A and the correction system lens group 22B due to their self-weight is prevented.

The ratio conversion system lens group 22A, the correction system lens group 22B, and the weight 50 move along the optical axis in cooperation with the rotation of the cam barrel 31. The movement of the ratio conversion system lens group 22A and the correction system lens group 22B and the movement of the weight 50 are opposite to each other. Accordingly, when the lens barrel 11 is slanted, the movement of the ratio conversion system lens group 22A and the correction system lens group 22B due to their self-weight can be prevented.

In the lens apparatus 10 described above, the cam barrel 31 is fitted in the fixed barrel 30. The zoom ring 42 fitted outside the fixed barrel 30 and the cam barrel 31 are connected through the connection pin 36 penetrating the fixed barrel 30, so that the cam barrel 31 is rotated by the rotation operation of the connect pin 36. As such, the penetration hole 37 of the fixed barrel 30, which the connection pin 36 penetrates, is extended in the circumferential direction of the fixed barrel 30. However, in order to maintain the strength of the fixed barrel 30, the extended range is preferably less than about 90° around the optical axis.

If the extended range of the penetration hole 37 is about 90° around the optical axis, the range of the rotation of the cam barrel 31 also is about 90° around the optical axis. In that case, in order to secure the movement distance of the ratio conversion system lens group 22A and the correction system lens group 22B, the lead angles of the cam grooves 33A and 33B need to increase. As a result, when the lens barrel 11 is slanted, torque generated to the cam barrel 31 due to the self-weight of the ratio conversion system lens group 22A and the correction system lens group 22B also increases, so that the cam barrel 31 is also easily rotated. In that case, the rotation of the earn barrel 31 can be effectively prevented by the opposite operation of the weight 50 as described above.

In the above descriptions, the configuration to prevent the movement of the ratio conversion system lens group 22A and the correction system lens group 22B due to their self-weight has been described. However, the present invention can be applied to other movable lens units such as the moving focus lens group 20B or the rear master lens group 26B.

As described above, this specification describes a lens apparatus including an optical system including a movable lens unit, a lens barrel including a fixed barrel supporting the movable lens unit to be forwardly and backwardly movable along the optical axis of the optical system, and a cam barrel engaged with the movable lens unit and supported to the fixed barrel to be rotatable around the optical axis, so that the movable lens unit forwardly and backwardly moves due to the rotation of the cam barrel, as a lens barrel for containing the optical system, and a weight engaged with the cam barrel and forwardly and backwardly moving along the optical axis in a direction opposite to the movable lens unit due to the rotation of the cam barrel, as a weight for preventing the movement of the movable lens unit when the lens barrel is slanted so that the optical axis is slanted to the horizontal direction.

In the lens apparatus described in this specification, when the lens barrel is slanted so that the optical axis is slanted to the horizontal direction, torque generated to the cam barrel due to the self-weight of the weight and torque generated to the cam barrel due to the self-weight of the movable lens unit are balanced.

In the lens apparatus described in this specification, the cam barrel is fitted in the fixed barrel. The cam barrel additionally includes an operation ring fitted outside the fixed barrel and supported to the fixed barrel to be rotatable around the optical axis, and a connection member penetrating the fixed barrel to connect the cam barrel and the operation ring.

In the lens apparatus described in this specification, the weight is in a circular shape and fitted outside the fixed barrel to be supported to the fixed barrel.

In the lens apparatus described in this specification, the movable lens unit is a zoom lens group.

This specification describes a TV camera equipped with any one of the lens apparatuses that has been described.

10 lens apparatus
11 lens barrel
20 focus optical system
20A fixed focus lens group
20B moving focus lens group
22 zoom optical system
22A ratio conversion system lens group
22B correction system lens group
24 iris
26 master optical system
26A front master lens group
26B rear master lens group
30 fixed barrel
31 cam barrel
32 guide groove
33A cam groove
33B cam groove
34A lens frame
34B lens frame
35A cam follower
35B cam follower
36 connection pin
37 penetration hole
40 focus ring
42 zoom ring
44 iris ring
46 back focus operation ring
50 weight
51 guide groove
52 cam groove
53 engaging pin
55 cam pin

What is claimed is:

1. A lens apparatus comprising:
    an optical system that includes a movable lens unit;
    a lens barrel that houses the optical system and includes:
        a fixed barrel supporting the movable lens unit to be forwardly and backwardly movable along an optical axis of the optical system; and
        a cam barrel engaged with the movable lens unit, supported by the fixed barrel to be rotatable around the optical axis, and configured to forwardly and backwardly move the movable lens unit in accordance with the rotation of the cam barrel;
    a weight that is engaged with the cam barrel and forwardly and backwardly moves along the optical axis in a direction opposite to a moving direction of the movable lens unit in accordance with the rotation of the cam barrel, the weight preventing the movement of the movable lens unit when the lens barrel is slanted so that the optical axis is slanted to the horizontal direction, the weight having a circular shape and is fitted outside the fixed barrel to be supported to the fixed barrel, wherein the cam barrel has a first spiral cam groove for moving the movable lens unit along the optical axis and the weight has a second spiral cam groove for moving the weight along the optical axis, and the first spiral cam groove and the second cam groove are different from each other in spiral wrapping direction so that the weight moves along the optical direction in the direction opposite to the moving direction of the movable lens unit.

2. The lens apparatus according to claim 1, wherein when the lens barrel is slanted so that the optical axis is slanted to the horizontal direction, torque generated to the cam barrel due to the self-weight of the weight and torque generated to the cam barrel due to the self-weight of the movable lens unit are balanced.

3. The lens apparatus according to claim 1, wherein the cam barrel is fitted in the fixed barrel, and additionally includes an operation ring fitted outside the fixed barrel and supported to the fixed barrel to be rotatable around the optical axis, and a connection member penetrating the fixed barrel to connect the cam barrel and the operation ring.

4. The lens apparatus according to claim 1, wherein the movable lens unit is a zoom lens group.

5. A TV camera equipped with the lens apparatus according to claim 1.

6. The lens apparatus according to claim 1, wherein the movable lens unit is moved along the optical axis in a first direction and the weight is moved along the optical axis in a second direction opposite to the first direction when the cam barrel is rotated around the optical axis in a first rotation direction, and the movable lens unit is moved along the optical axis in the second direction and the weight is moved along the optical axis in the first direction when the cam barrel is rotated around the optical axis in a second rotation direction opposite to the first rotation direction.

7. The lens apparatus according to claim 1, wherein the weight has a linear guide groove extending along the optical axis.

8. The lens apparatus according to claim 1, wherein the weight is fitted outside the fixed barrel to be movable around the optical axis and forwardly and backwardly movable along the optical axis.

9. The lens apparatus according to claim 1, wherein the weight is disposed at an empty space on an outer circumference of the fixed barrel overlapping with the cam barrel while escaping a zoom ring.

10. A lens apparatus comprising:
    an optical system that includes a movable lens unit;
    a lens barrel that houses the optical system and includes:
        a fixed barrel supporting the movable lens unit to be forwardly and backwardly movable along an optical axis of the optical system; and
        a cam barrel engaged with the movable lens unit, supported by the fixed barrel to be rotatable around the optical axis, and configured to forwardly and backwardly move the movable lens unit in accordance with the rotation of the cam barrel;
    a weight that is engaged with the cam barrel and forwardly and backwardly moves along the optical axis in a direction opposite to a moving direction of the movable lens unit in accordance with the rotation of the cam barrel, the weight preventing the movement of the movable lens unit when the lens barrel is slanted so that the optical axis is slanted to the horizontal direction, the weight having a circular shape and is fitted outside the fixed barrel to be supported to the fixed barrel, wherein the weight has a linear guide groove extending along the optical axis, and the weight has a spiral cam groove for moving the weight along the optical axis.

11. The lens apparatus according to claim 10, wherein the linear guide groove and the spiral cam groove penetrate from an inside of the weight to an outside of the weight.

12. The lens apparatus according to claim 10, wherein the linear guide groove and the spiral cam groove are exposed on at least an inner circumferential surface of the weight.

13. The lens apparatus according to claim 10, wherein a cam pin is provided in the fixed barrel, and the cam pin is engaged into the spiral cam groove of the weight.

14. The lens apparatus according to claim 13, wherein the weight is configured to rotate around the optical axis due to the rotation of the cam barrel, so that the immovable cam pin moves in a direction opposite to the rotation direction of the weight.

15. A lens apparatus comprising:
an optical system that includes a movable lens unit;
a lens barrel that houses the optical system and includes:
  a fixed barrel supporting the movable lens unit to be forwardly and backwardly movable along an optical axis of the optical system; and
  a cam barrel engaged with the movable lens unit, supported by the fixed barrel to be rotatable around the optical axis, and configured to forwardly and backwardly move the movable lens unit in accordance with the rotation of the cam barrel;
  a weight that is engaged with the cam barrel and forwardly and backwardly moves along the optical axis in a direction opposite to a moving direction of the movable lens unit in accordance with the rotation of the cam barrel, the weight preventing the movement of the movable lens unit when the lens barrel is slanted so that the optical axis is slanted to the horizontal direction, the weight having a circular shape and is fitted outside the fixed barrel to be supported to the fixed barrel, wherein
the weight has a linear guide groove extending along the optical axis, and
an engaging pin is provided in the cam barrel, and the engaging pin penetrates from an inside of the fixed barrel to an outside thereof to be engaged into the linear guide groove of the weight.

16. The lens apparatus according to claim 15, wherein in the fixed barrel, a penetration hole, which the engaging pin penetrates, extends in a circumferential direction of the fixed barrel.

17. The lens apparatus according to claim 15, wherein rotation of the cam barrel is transferred to the weight through the engaging pin.

18. The lens apparatus according to claim 15, wherein the weight is configured to rotate around the optical axis in an integrated form with the cam barrel.

* * * * *